US011986840B2

(12) United States Patent
Langer et al.

(10) Patent No.: US 11,986,840 B2
(45) Date of Patent: May 21, 2024

(54) CENTRIFUGE WITH ELASTOCALORIC COOLING AND METHOD FOR COOLING A CENTRIFUGE

(71) Applicant: Thermo Electron LED GmbH, Langenselbold (DE)

(72) Inventors: Daniel Langer, Osterode (DE); Andreas Karl, Osterode (DE)

(73) Assignee: THERMO ELECTRON LED GMBH, Langenselbold (DE)

( * ) Notice: Subject to any disclaimer, the term of this patent is extended or adjusted under 35 U.S.C. 154(b) by 148 days.

(21) Appl. No.: 17/517,909

(22) Filed: Nov. 3, 2021

(65) Prior Publication Data

US 2022/0143628 A1 May 12, 2022

(30) Foreign Application Priority Data

Nov. 6, 2020 (DE) ......................... 102020214000.6

(51) Int. Cl.
*B04B 15/02* (2006.01)
*B04B 5/04* (2006.01)
*F25B 23/00* (2006.01)

(52) U.S. Cl.
CPC ............ *B04B 15/02* (2013.01); *B04B 5/0414* (2013.01); *F25B 23/00* (2013.01)

(58) Field of Classification Search
CPC ........ B04B 15/02; B04B 5/0414; F25B 23/00
See application file for complete search history.

(56) References Cited

U.S. PATENT DOCUMENTS 4,385,594 A * 5/1983 Hauser, Jr. .............. F04D 5/002 123/41.46
2012/0273158 A1 11/2012 Cui et al.
(Continued)

FOREIGN PATENT DOCUMENTS

CN 203161542 U * 8/2013
DE 102014107294 A1 11/2015
(Continued)

OTHER PUBLICATIONS

Fraunhofer Institute for Physical Measurement Techniques IPM, Article for Elastocaloric Systems, Efficient Cooling Systems Without the Need for Harmful Refrigerants, www.ipm.fraunhofer.de/en, Aug. 2019.

*Primary Examiner* — Walter D. Griffin
*Assistant Examiner* — Shuyi S. Liu
(74) *Attorney, Agent, or Firm* — BakerHostetler

(57) ABSTRACT

The present invention relates to a centrifuge, in particular a laboratory centrifuge, comprising a rotor which is rotatably mounted in an interior of a rotor chamber and is designed to accommodate sample vessels, a drive motor to set the rotor in rotation, and a cooling device which is designed to dissipate heat from the interior of the rotor chamber via a coolant, the cooling device being designed to use an elastocaloric effect and having at least one cooling unit which comprises an elastocaloric material arranged between a counter block and a punch, the punch being designed to periodically apply a force to the elastocaloric material and then to let the elastocaloric material relax again, the cooling device being designed to transfer both heat from the elastocaloric material to the coolant and from the coolant to the elastocaloric material. The present invention also relates to a method for cooling an interior of a rotor chamber of such a centrifuge.

10 Claims, 8 Drawing Sheets

(56) References Cited

U.S. PATENT DOCUMENTS

| | | | | |
|---|---|---|---|---|
| 2017/0189916 | A1 * | 7/2017 | Eberle | B04B 7/02 |
| 2019/0032969 | A1 * | 1/2019 | Bartholome | F03G 7/0646 |

FOREIGN PATENT DOCUMENTS

| | | | | |
|---|---|---|---|---|
| DE | 102012021986 | B4 | | 12/2015 |
| DE | 102016100596 | A1 | | 6/2017 |
| DE | 102019004958 | A1 | | 1/2021 |
| JP | 05126046 | A | * | 5/1993 |

* cited by examiner

CENTRIFUGE WITH ELASTOCALORIC COOLING AND METHOD FOR COOLING A CENTRIFUGE

CROSS-REFERENCE TO RELATED APPLICATION

The present application claims priority under 35 U.S.C. § 119 of German Patent Application No. 10 2020 214 000.6, filed Nov. 6, 2020, the disclosure of which is hereby incorporated herein by reference in its entirety.

FIELD OF THE INVENTION

The present invention relates to a centrifuge, in particular to a laboratory centrifuge. The present invention also relates to a method for cooling the interior of a rotor chamber of a centrifuge, in particular a laboratory centrifuge.

BACKGROUND OF THE INVENTION

Centrifuges and, in particular, laboratory centrifuges usually comprise a rotor which is rotatably mounted in the interior of a rotor chamber and is designed to accommodate sample vessels, the samples being separated into different fractions by the centrifugal force acting on them during the rotation of the rotor. For this purpose, the centrifuges have a drive motor to set the rotor in rotation. The rotors are divided into different classes depending on the type of storage and centrifugation of the samples, namely swing-bucket rotors and fixed-angle rotors. In the latter, the samples are arranged at an invariable angle to the axis of rotation in the rotor. In swing-bucket rotors, the angle of the samples to the axis of rotation changes during the centrifugation process because the centrifuge cup, in which the samples are arranged, swings outward during rotation from a rest position in which the centrifuge cup hangs downward in the direction of gravity. Centrifuges of this type are used in laboratories to separate mixtures of substances into their constituents using centrifugal force. In many applications, the mixtures of substances are biological or microbiological samples. One example is cell suspensions, which come from fermentation tanks, bioreactors, or similar containers, for example, and which are to be divided into their constituents by centrifugation. Before centrifuging, the cell suspension must be transferred from the container into suitable sample containers in which they can be centrifuged. Generic centrifuges are also often used in other fields, for example chemistry, food technology, and the mineral oil industry. Since many of the samples used must not be heated above certain temperatures, it is common for the centrifuges to have a cooling device which is designed to dissipate heat from the interior of the rotor chamber via a coolant. A typical operating temperature is 4° C., for example. Since heat is continuously generated by the air friction during the rotation of the rotor, the rotor chamber must also be continuously cooled.

Generic centrifuges are known, for example, from DE 10 2012 021 986 B4 and the application with the number DE 10 2019 004 958.6 of the applicant. The problem with the known centrifuges is that current cooling devices, often compressor cooling, require environmentally harmful or flammable coolants. On the one hand, the legal requirements for the environmental friendliness of the coolants used are steadily increasing. In addition, the safety of centrifuges is an important criterion, since, for example, if the rotor bursts or in the case of other defects, dangers for the operator and bystanders must be avoided.

It is therefore an aspect of the present application to specify a centrifuge and a method for cooling a centrifuge, in which both the environmental friendliness is increased and the safety is improved. At the same time, sufficient cooling of the samples must be ensured during centrifugation. Ultimately, the manufacturing and operating costs of the centrifuge should be kept as low as possible.

SUMMARY OF THE INVENTION

Specifically, the solution is achieved in a centrifuge of the generic type described at the outset, in particular a laboratory centrifuge, in that the cooling device is designed to use the elastocaloric effect. It has at least one cooling unit which comprises an elastocaloric material arranged between a counter block and a punch. The punch is designed to periodically apply a force to the elastocaloric material and then to let the elastocaloric material relax again. This is achieved, for example, in that the punch itself applies a force to a drive and this force is transferred to the elastocaloric material. In addition, the cooling device is designed to transfer both heat from the elastocaloric material to the coolant and from the coolant to the elastocaloric material.

The elastocaloric effect describes the phenomenon that various materials, typically metal alloys, but also rubber, for example, change their heat capacity reversibly under tensile stress or pressure. This is noticeable in a change in temperature of the elastocaloric material. For example, elastocaloric materials heat up when sufficiently high pressure is applied to them. If the excess heat is then transported away by the elastocaloric materials, the temperature of the elastocaloric material drops below the initial temperature upon relaxation. The corresponding effects occur again and again with periodic repetition. In this way, the elastocaloric effect can be used for cooling. The elastocaloric effect is known per se. A cycle-based system for its use is disclosed in DE 10 2016 100 596 A1, for example.

The at least one cooling unit of the cooling device comprises the elastocaloric material and the means that are necessary to periodically apply a force to the elastocaloric material. Specifically, the elastocaloric material is arranged in a space between the counter block and the punch. A drive motor applies a force to the punch, which force is transferred to the elastocaloric material. The counter block is in turn arranged in a stationary manner in the cooling device and serves as an abutment. Both the punch and the counter block are in direct contact with the elastocaloric material according to one embodiment. In addition, the cooling unit has connections via which a coolant can be brought into contact with elements of the cooling unit, for example with the elastocaloric material and/or the counter block.

In addition, it is provided that the cooling device transfers both heat from the elastocaloric material to the coolant and from the coolant to the elastocaloric material. In particular, the coolant absorbs heat multiple times, once from the interior of the rotor chamber of the centrifuge, and it absorbs the heat released at least once when a force is applied to the elastocaloric material. The correspondingly heated coolant is then transported to a cooler which may be equipped with a fan and which is designed to transfer heat from the coolant to the ambient air. The coolant is therefore cooled in the cooler and then transported back to the cooling unit. The coolant gives off more heat to the elastocaloric material cooled by the relaxation and becomes even colder as a result.

This cooled coolant is in turn transported to the rotor chamber of the centrifuge in order to again absorb heat from the interior. There is a net transport of heat from the interior of the rotor chamber of the centrifuge into the ambient air. The heating of the coolant by the elastocaloric material is used to be able to heat the coolant coming from the rotor chamber, which is in the range of 4° C., for example, above the ambient temperature, which is 21° C., for example. This alone makes it at all possible to transfer heat from the coolant to the ambient air.

Overall, the cooling device is designed to transport heat from the rotor chamber of the centrifuge to a cooler equipped with a fan, which is designed to dissipate at least part of the heat into the ambient air. According to one embodiment of the present invention, it is provided that the cooling device has two coolant circuits, the cooling unit being able to be connected to one of the two coolant circuits via valves. The coolant of the two coolant circuits is therefore not strictly separated from one another, but there is a specific exchange via the cooling unit. The coolant of the two coolant circuits is therefore the same coolant. For example, the cooling device comprises a first coolant circuit between the rotor chamber, which may be wound with coolant lines, and the cooling unit. This first coolant circuit is designed to absorb heat at the rotor chamber and thereby cool it, then to transport the heat to the cooling unit and to dissipate it. In other words, the coolant is cooled at the cooling unit and then cooled and transported back to the rotor chamber. In addition, the cooling device comprises, for example, a second coolant circuit between the cooling unit and a cooler. The cooler is designed, for example, as a gas-liquid heat exchanger and is equipped with a fan that ensures an airflow around the cooler. This second coolant circuit is designed to absorb heat from the cooling unit and to transport it to the cooler, where the heat is at least partially transferred to the ambient air. In other words, the coolant is cooled at the cooler and then fed back to the cooling unit. The cooling unit is connected to the first or the second coolant circuit via two valves, for example two 2-way valves. In one embodiment, the cooling unit is connected to the second coolant circuit in the phase in which a force is applied to the elastocaloric material—and heat is released as a result—so that the heat released is transported from the coolant to the cooler. In return, the cooling unit is connected to the first coolant circuit in the phase in which the elastocaloric material relaxes—and cools down in the process—so that the elastocaloric material absorbs heat from the coolant coming from the rotor chamber and cools it according to one embodiment. The two coolant circuits can be designed in such a way that the coolant flows through the cooling unit in the same direction, regardless of which coolant circuit the cooling unit is connected to. Alternatively, it can also be provided that the coolant flows through the cooling unit in the two coolant circuits in opposite directions.

In accordance with one embodiment of the present invention, at least one pump is provided which conveys the coolant in both coolant circuits. For example, one pump is provided for each coolant circuit, i.e., a total of two pumps. One pump in each case conveys the coolant of a coolant circuit. In particular, the pumps are synchronized with the switching intervals of the valves that connect the cooling unit to the coolant circuits. Since only coolant from one of the two coolant circuits flows through the cooling unit at a given point in time, it is sufficient that only the pump of the corresponding coolant circuit to which the cooling unit is connected is operated at this point in time. The advantage of using two pumps is that the flow path divided by the two coolant circuits is substantially limited to the cooling unit, which means that there is particularly little mixing of the cold coolant on the rotor chamber side with the warm coolant on the cooler side. In an alternative embodiment, there is only a single pump for both coolant circuits. The pump is arranged, for example, directly upstream or downstream of the cooling unit and is likewise connected to one or the other coolant circuit by the valves together with the at least one cooling unit. This allows the pump to be operated continuously. The volume of coolant present in the pump lowers the cooling performance by mixing the coolant of the two coolant circuits, but depending on the application, this can still be advantageous by saving an additional pump and its operating costs.

In addition to the embodiments in which the coolant circuits are circulated by pumps, the present invention also includes embodiments that manage completely without pumps. For example, in one embodiment of the present invention, it is provided that each of the two coolant circuits comprises a heat pipe and that the coolant is transported in the coolant circuits exclusively passively. The heat pipes can each be designed, for example, as a heat pipe or as a two-phase thermosiphon. Heat pipes are heat exchangers with a particularly high heat flux density, for example metal pipes with a coolant inside. The heat pipe can absorb heat on one side, for example on the rotor chamber, as a result of which the coolant evaporates. The gaseous coolant is evenly distributed in the heat pipe and condenses on a side where heat is dissipated, for example to the cooling unit. The liquid coolant is transported back to the evaporator side within the heat pipe, specifically in a purely passive manner, for example by means of capillary forces or gravity. This creates a coolant circuit within the heat pipe, which is driven solely by the absorption and dissipation of heat by the coolant and does not require a separate pump. The two coolant circuits can therefore each be implemented as a heat pipe, with one heat pipe transporting heat from the rotor chamber to the cooling unit and the other heat pipe transporting heat from the cooling unit to the cooler. The connection of the heat pipes to the cooling unit can again take place, for example, via a valve, for example a 2-way valve. This valve is again synchronized with the phases of the application of a force to the elastocaloric material, so that it absorbs heat coming from the rotor chamber and emits heat in the direction of the cooler. Alternatively, the cooling unit can, for example, be designed in interaction with the heat pipes in such a way that the coolant of the heat pipe, which transports heat to the cooler, is in contact with the interior of the cooling unit, while the coolant of that heat pipe, which transports heat from the rotor chamber to the cooling unit, is in thermal contact with the counter block of the cooling unit. The two coolant spaces of the heat pipes are therefore separated from one another. With its interior, in which the elastocaloric material is located, the cooling unit forms, for example, the end of the heat pipe coming from the cooler. The counter block is either in contact with the end of the heat pipe coming from the rotor chamber or forms this end. During operation, the coolant of the heat pipe coming from the rotor chamber is therefore condensed on the counter block or in the vicinity of the counter block, while the coolant of the heat pipe coming from the cooler is heated, preferably evaporated, directly on the elastocaloric material. In this way, heat is transported from the rotor chamber to the cooler. Another alternative is to arrange a further, separate coolant circuit between the heat pipes, which transfers heat from one heat pipe to the other via the cooling unit. It would also be possible to provide a transport device that brings the cooling unit into contact with the heat pipe coming from the cooler during the application of a force, i.e., while the elastocaloric material is heating, while it brings the cooling unit into contact with the heat pipe coming from the rotor chamber during the relaxation phase, i.e., while the elastocaloric material cools down. The transport device thus moves the cooling unit between a heat-absorbing position in contact with the heat pipe coming from the rotor chamber and a heat-dissipating position in contact with the heat pipe coming from the cooler. In this way, too, heat is transported from the rotor chamber to the cooler.

The cooling device of the present invention can advantageously be further developed by a number of different features. In order, for example, to achieve a sufficient temperature lift so that the interior of the rotor chamber can be cooled efficiently, it is provided that the cooling device has a plurality of cooling units connected in series. In this way, the amount of elastocaloric material used is increased without driving the force to be applied to the punch to heights that are no longer realizable.

In principle, the cooling device can be operated in such a way that the elastocaloric material is loaded under tensile stress via the force applied. However, it has been shown that the elastocaloric materials periodically subjected to tensile stress have a significantly shorter service life than if they are periodically subjected to pressure. It is therefore provided that the counter block and the punch are designed to periodically apply pressure to the elastocaloric material.

The elastocaloric material can in principle be used in various forms, for example as foils or films applied to carrier materials. However, the elastocaloric material is designed to be rod-shaped, for example as round or angular rods according to one embodiment. In particular, the cooling device comprises a plurality of elements with elastocaloric material, for example a plurality of such rods. It has been found to be particularly advantageous if a force, for example a pressure, is applied to the rods made of elastocaloric material along their axis of longitudinal extent.

In principle, the cooling device can be designed in such a way that the coolant used is, for example, always liquid. However, the cooling device can be designed to use the latent heat of the coolant. This is understood to mean the use of the enthalpy of conversion, for example the absorption of heat during evaporation and its dissipation during the condensation of the coolant. This is also used in the heat pipes already described above. The cooling device can be designed in such a way that at least the coolant evaporates in the cooling units, so that the coolant absorbs heat and this absorption results in a phase transition. In addition, the coolant condenses inside the cooler and in this case gives off heat to the cooler, which is at least partially transferred to the ambient air according to one embodiment. By using the latent heat of the coolant, a considerably more efficient heat transfer is achieved.

The efficiency of the heat transfer is increased in that the coolant is in direct contact with the counter block and/or the elastocaloric material according to one embodiment. Since the counter block is in direct contact with the elastocaloric material, the counter block is may be made of a thermally conductive material, for example a metal, so that the counter block is cooled, for example, by the relaxing elastocaloric material. For example, the heat released during the application of force is transferred to a coolant on the elastocaloric material and transported away by it. The relaxing elastocaloric material cools down and cools the counter block in the process. In this way, the cooled counter block can then come into contact with the coolant in order to cool the coolant.

The coolant itself may be environmentally friendly and/or non-flammable and/or non-explosive. In particular, it is an aqueous coolant, and the coolant advantageously comprises water and/or ethanol. The coolant or its composition is selected, for example, such that its latent heat can be used in the temperature range present in the cooling device. The use of non-flammable, non-explosive, and, in particular, aqueous coolants has the advantage that they pose no danger even if the rotor breaks in a crash and rotor fragments that are flying around destroy parts of the coolant circuit and thus coolant escapes. Another advantage is that the basic structure of known centrifuges, for example those with compressor cooling, only has to be changed insignificantly in order to use the present invention. The rotor chamber and the cooling tubes surrounding it and, if necessary, an armored ring enclosing the rotor chamber can be incorporated practically unchanged into the centrifuge according to the present invention. Since the elastocaloric cooling unit has a rather small space requirement compared to a compressor cooling unit, it can easily be installed in its place in conventional centrifuge housings.

It can be provided that the cooling device comprises a drive motor which is designed to periodically apply the force to the punch. This can be a separate drive motor that is used exclusively for this purpose. A variety of linear actuators are available that can be used in the present invention. These include, for example, electromagnetic linear drives, spindle-mechanical linear drives, hydraulic units, piezo actuators, pneumatic units, and lifting magnets. All of these drives are basically suitable for applying sufficient force to the punch. A suitable drive motor can be selected depending on the force actually to be applied, which is very much dependent on the amount of elastocaloric material used per cooling unit. A rotating drive, for example via an eccentric or a piston, is also possible and in the present case even preferred, as will be described in more detail below.

In principle, the present invention can be implemented with a large number of different elastocaloric materials. It is important in this case that, on the one hand, a sufficient temperature lift for cooling the interior of the rotor chamber can be achieved and, on the other hand, that the service life of the material under periodic loading is sufficiently long. The elastocaloric material may be a metal alloy, in particular a shape memory alloy. The following alloys are particularly suitable for this purpose: nickel-titanium alloy (NiTi), nickel-titanium-copper alloy (NiTiCu), nickel-iron-gallium alloy ($Ni_2FeGa$), copper-zinc-aluminum alloy (CuZnAl), nickel-titanium-hafnium alloy (NiTiHf), copper-aluminum-nickel alloy (CuAlNi), copper-aluminum-beryllium alloy (CuAlBe), titanium-nickel-iron alloy (TiNiFe), titanium-nickel-copper-cobalt alloy (TiNiCuCo). The elastocaloric material may comprise at least one of these materials. A nickel-titanium alloy with 54.5 to 57 wt. % of nickel, a maximum of 0.05 wt. % of oxygen and nitrogen and a maximum of 0.02 wt. % of carbon and the remainder titanium (nitinol) is particularly preferred.

Another embodiment of the present invention provides that the cooling device comprises a cooling group which has a plurality of cooling units connected in series, the cooling units being arranged and designed in such a way that a rotating eccentric can successively apply a force to the punches of the cooling units. A plurality of cooling units connected in series are combined to form a cooling group. All of the cooling units in the cooling group are driven by a single drive motor which successively applies a force to the punches of the cooling units in the cooling group. For this purpose, it is provided, in particular, that the drive motor sets an eccentric in rotation and the eccentric presses one after the other on the punches of the cooling units during the rotation. For this purpose, the eccentric may be arranged in the middle of the cooling units, which are, in particular, arranged in a circle around the eccentric, the punch of the cooling unit being oriented toward the eccentric in each case. The coolant also flows through the cooling units in a circular manner with a direction of flow which corresponds to the direction of rotation of the eccentric. In this embodiment, the drive motor does not have to be a linear motor, but only has to set the eccentric in rotation.

Another embodiment of the present invention provides that the cooling units of the cooling group are each equipped with an overpressure valve on their inflow side and on their outflow side for the coolant, the overpressure valves only opening in one direction, specifically in the same direction. The cooling unit is also designed in such a way that the application of force to the elastocaloric material releases so much heat that the coolant evaporates. Effectively, the coolant enters the cooling unit and is in direct contact with the elastocaloric material. A force is then applied to this, which releases heat that is transferred to the coolant. The coolant evaporates (or an already evaporated coolant is heated further), which increases the pressure in the cooling unit. Due to the increased pressure, the overpressure valve at the outlet of the cooling unit opens, as a result of which the evaporated coolant at least partially flows out of the cooling unit and thereby takes part of the heat released with it. Next, the elastocaloric material relaxes again and cools down in the process. As a result, the pressure within the cooling unit drops again, so that new coolant can flow in via the overpressure valve at the inlet of the cooling unit. However, this does not happen immediately, so that, for example, the counter block of the cooling unit also cools down. Such cooling units having the corresponding valves are connected in series within the cooling group. The cooling units are activated one after the other by the rotating eccentric, which means that the coolant is always transported into the subsequent cooling unit via the pressure increase and takes heat with it in the process. In this way, on the one hand, the coolant is conveyed through the cooling group, a backflow being prevented by the fact that the overpressure valves used only open in one direction. In addition, the coolant absorbs more and more heat as it is transported through the cooling group and is heated more and more. At the same time, the counter blocks of the cooling units continue to cool down. The coolant flow driven by the cooling group can then, without the use of a separate pump, be conducted to the cooler, where excess heat is extracted from the coolant. This coolant cooled in this way can then be fed back to the cooling group and brought into contact with the counter blocks of the cooling units. In this way, the coolant is cooled even further until it has the required temperature to cool the rotor chamber. The coolant is then conducted from the counter blocks to the rotor chamber, where it absorbs heat and then flows back to the inlet of the cooling group. Overall, this embodiment is thus characterized in that the cooling device has only one coolant circuit and the transport of the coolant in this coolant circuit takes place exclusively passively. Passive transport is understood to mean that there is no pump to deliver the coolant. In contrast, the coolant is transported exclusively by the absorption of heat from the elastocaloric material and/or from the interior of the rotor chamber and by the dissipation of heat to the elastocaloric material and/or the ambient air. The cooling group itself, in which only a force is exerted on the elastocaloric material, is therefore explicitly not regarded as a pump.

It was already described above that the at least one cooling unit can be driven, for example, by a drive motor provided, in particular, for this purpose. In another alternative, however, it is provided that the drive motor drives both the rotor and the eccentric. It is therefore the same drive motor that is already present in the centrifuge to set the rotor in rotation. No separate drive motor is therefore provided in order to apply a force to the elastocaloric material. Rather, one and the same motor is used to drive the rotor and to apply a force to the elastocaloric material, for example by setting the eccentric in rotation. In addition, this one drive motor may also be used to drive the fan of the cooler. Particularly, one and the same drive motor may operate both the rotor of the centrifuge and the fan of the cooler and also applies the force to the elastocaloric material, for example by rotating an eccentric.

The eccentric used, which due to its eccentricity presses periodically on the punch of the at least one cooling unit or the cooling units of the cooling group during the rotation, can in principle be designed in different ways. In order to apply a force to the punch, the eccentric must typically slide along the punch over a certain distance. Frictional forces that cannot be neglected occur here, which on the one hand can lead to damage to the punch as well as to the eccentric. On the other hand, the drive of the eccentric is made more difficult by this friction. In another embodiment of the present invention, it is therefore provided that the eccentric has an eccentrically rotating shaft which is surrounded by a sleeve that can rotate relative to the shaft. With the sleeve, in turn, the eccentric comes into contact with the punch of the cooling unit. Because the sleeve can slide along the outer circumferential surface of the rotating shaft, significantly lower forces arise between the eccentric and the punch. In order to further simplify sliding, the eccentrically rotating shaft may be designed with a circular cross section. In order to keep the friction between the sleeve and the shaft as low as possible, the sleeve may be mounted on the shaft via a ball bearing. If the sleeve comes into contact with the punch, it rolls over the ball bearing against the eccentrically driven shaft, whereby the frictional forces when the eccentric makes contact with the punch is essentially reduced to the friction within the ball bearing, which prevents damage and simplifies the drive.

The aspect of the present invention described at the beginning is also achieved with a method for cooling the interior of a rotor chamber of a centrifuge, in particular a laboratory centrifuge, and a centrifuge according to the preceding embodiments. All the features, effects, and advantages described for the centrifuge according to the present invention apply in a figurative sense to the method and vice versa. Only to avoid repetition, reference is made to the other embodiments in each case.

The method according to the present invention comprises the steps of transferring heat from the interior of the rotor chamber to a coolant, transferring heat from an elastocaloric material to the coolant, cooling the coolant in a cooler, transferring heat from the coolant to the elastocaloric material, and supplying the coolant to the rotor chamber of the centrifuge. The method then starts from the beginning and ensures that the rotor chamber of the centrifuge is cooled down or that a desired low temperature is maintained at which the samples that are to be centrifuged in the centrifuge must be stored.

BRIEF DESCRIPTION OF THE DRAWINGS

The present invention is described in more detail below with reference to the embodiments shown in the figures. The embodiments serve only to describe preferred embodiments of the present invention, without this being restricted to the examples. Identical or identically acting components are numbered with the same reference signs. Repeated components are not identified separately in each figure. Schematically, in the drawings.

DETAILED DESCRIPTION OF THE INVENTION

Figure 1:
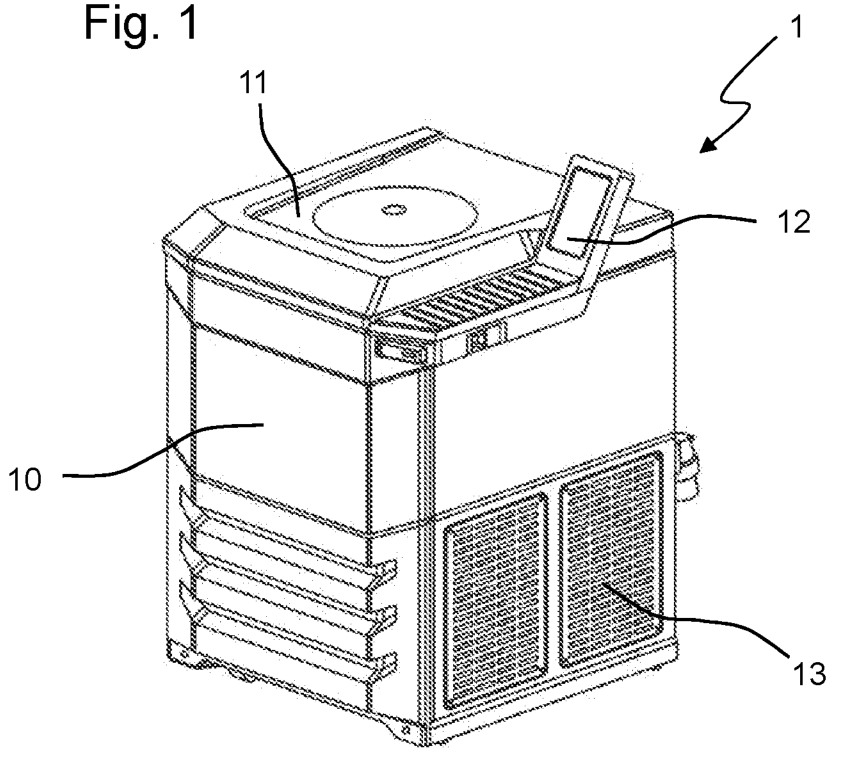
FIG. 1 is a perspective view of a centrifuge.
Figure 2:
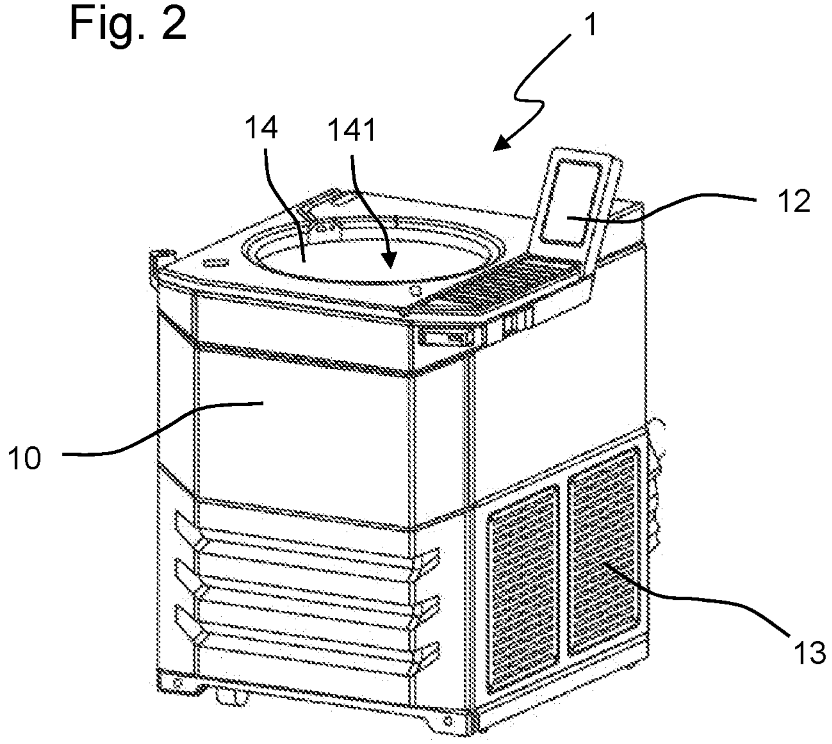
FIG. 2 shows the centrifuge according to FIG. 1 without a cover.
Figure 3:
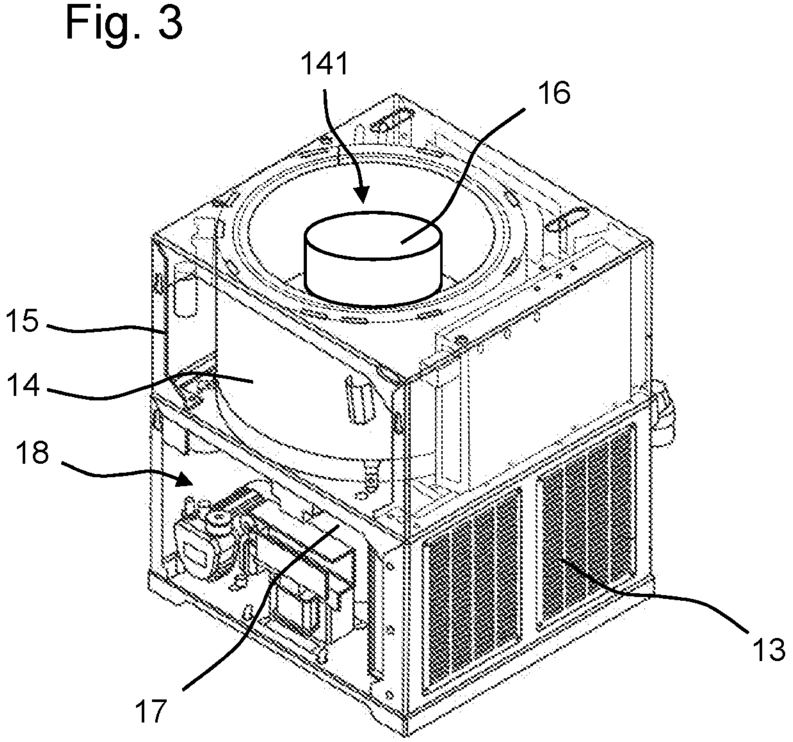
FIG. 3 shows the centrifuge according to FIGS. 1 and 2 without a housing.

FIGS. 1 to 3 show a centrifuge according to the present invention, here a laboratory centrifuge 1, the basic structure of which is similar to a conventional centrifuge; in this case, a floor-standing centrifuge. The laboratory centrifuge 1 comprises a housing 10 and a cover 11. The housing 10 has ventilation openings 13 through which warm air can be dissipated from the housing 10 of the laboratory centrifuge 1 into the outside environment. In addition, the laboratory centrifuge 1 has an operating unit 12 by means of which an operator can set various parameters on the centrifuge, for example the speed of rotation and the desired temperature at which the samples are to be kept. In FIG. 2, the cover 11 and in FIG. 3 the entire housing 10 has been removed, so that the support frame 15 of the laboratory centrifuge 1 is visible in FIG. 3. As can be seen from these figures, the laboratory centrifuge 1 has a rotor chamber 14, in the interior 141 of which a rotor 16 is rotatably mounted. The rotor 16 is designed to accommodate sample vessels, for example as a fixed-angle rotor or as a swing-bucket rotor. So that the samples in the rotor 16 continue to remain cooled to a predetermined temperature during centrifugation, the rotor chamber 14 must be cooled during operation of the centrifuge. For this purpose, the laboratory centrifuge 1 has a cooling device 18, which will be described in more detail below. The laboratory centrifuge 1 likewise has a drive motor 17 to drive the rotor 16 and, in particular, also the cooling device 18.

Figure 4:
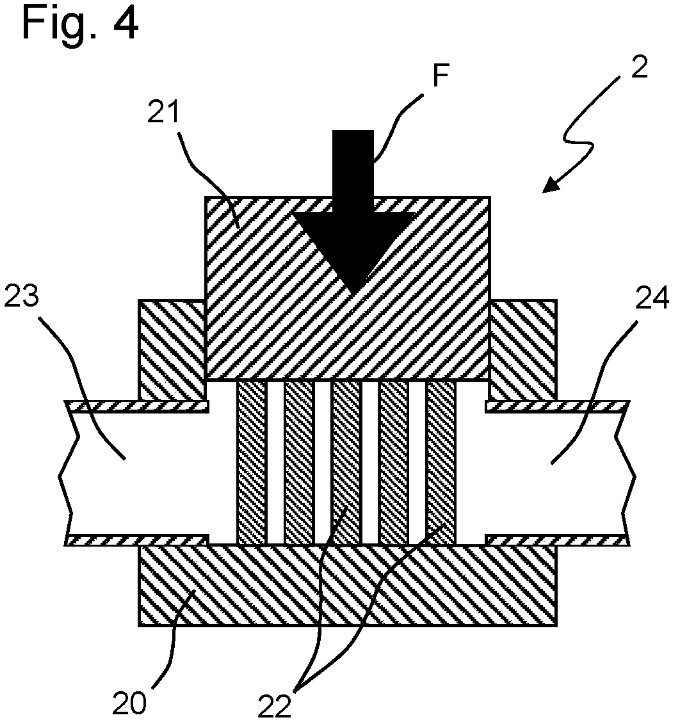
FIG. 4 is a cross section through a cooling unit.

FIG. 4 shows a cross section through an elastocaloric cooling unit 2. The cooling unit 2 comprises a counter block 20 which serves as an abutment for the elastocaloric material 22 and as a housing for the cooling unit 2. In one embodiment of the present invention, the elastocaloric material 22 is designed as a multiplicity of rods which are arranged between the counter block 20 and a punch 21. The punch 21 is slidably mounted on the side walls of the counter block 20 so that it transfers a force F, which force is symbolized by the black arrow, in a one-to-one manner to the elastocaloric material 22. In addition, the cooling unit 2 has a feed line 23 through which coolant can enter the cavity formed by the counter block 20 in which the elastocaloric material 22 is located. If a force F is applied to the elastocaloric material 22, it is heated, as a result of which heat is transferred to the coolant. In turn, the elastocaloric material 22 cools while it relaxes. In this case, the coolant is also cooled. The heated or cooled coolant can leave the cooling unit 2 via the discharge line 24 which, like the feed line 23, forms a channel through the counter block 20.

Figure 5:
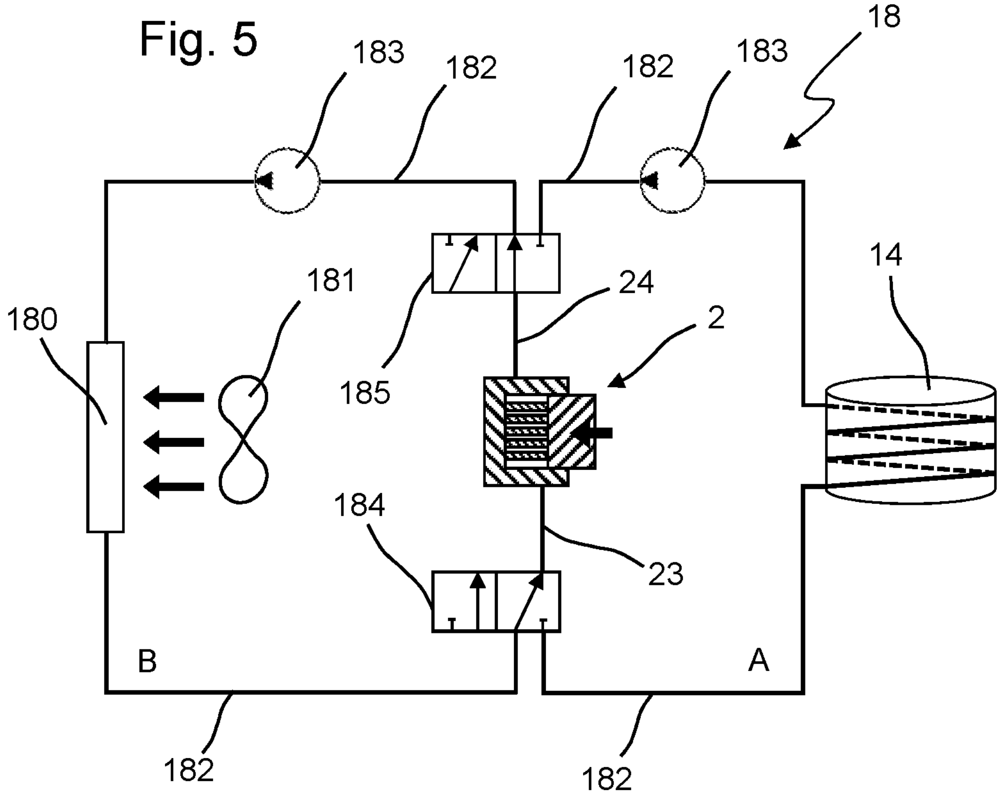
FIG. 5 shows a first embodiment of a cooling device.

FIG. 5 shows a first embodiment of a cooling device 18 using the cooling unit 2. The cooling device 18 is designed to transport heat from the rotor chamber 14 of the laboratory centrifuge 1 to a cooler 180. The cooler 180 is designed, for example, as an air-liquid heat exchanger and transfers at least part of the heat of the coolant to the ambient air with the aid of the fan 181. The cooling device 18 comprises a first coolant circuit A, which is designed to transport heat from the rotor chamber 14 to the cooling unit 2. The first coolant circuit A comprises a coolant line 182 which, for example, winds around the rotor chamber 14 and thus absorbs heat from it. In addition, the cooling device 18 comprises a second coolant circuit B, which is designed to transport heat from the cooling unit 2 to the cooler 180 and which likewise has a coolant line 182 for this purpose. The same coolant is used in both coolant circuits A, B. The coolant in the coolant lines 182 is conveyed via a pump 183 in each case, which pump is located in the corresponding coolant circuit A, B. Finally, the cooling device 18 also comprises two valves, specifically a first valve 184 and a second valve 185, which are each designed as 2-way valves. The cooling unit 2 can be connected to either the first coolant circuit A or the second coolant circuit B via the inlet and outlet lines 23, 24 via the two valves 184, 185. For this purpose, the valves 184, 185 are adjusted simultaneously between their switching positions shown.

In the position shown in FIG. 5, the cooling unit 2 is connected to the second coolant circuit B, for example. The cooling device 18 is operated, for example, in this switching position, while the force F is applied to the elastocaloric material 22 of the cooling unit 2. By means of the change in the heat capacity of the elastocaloric material 22, heat is released therefrom. The heat is absorbed by the coolant of the second coolant circuit B and transported to the cooler 180. The switching position of the two valves 184, 185 is then switched over so that the cooling unit 2 is located in the first coolant circuit A. The force F is taken from the punch 21 and thus from the elastocaloric material 22, whereby this material relaxes. In doing so, the material changes its heat capacity again, in particular in such a way that the elastocaloric material 22 cools down. In this way, the elastocaloric material 22 absorbs heat from the coolant of the first coolant circuit A and thereby cools it down. The cooled coolant in the first coolant circuit A is then transported to the rotor chamber 14 and cools said chamber.

Figure 6:
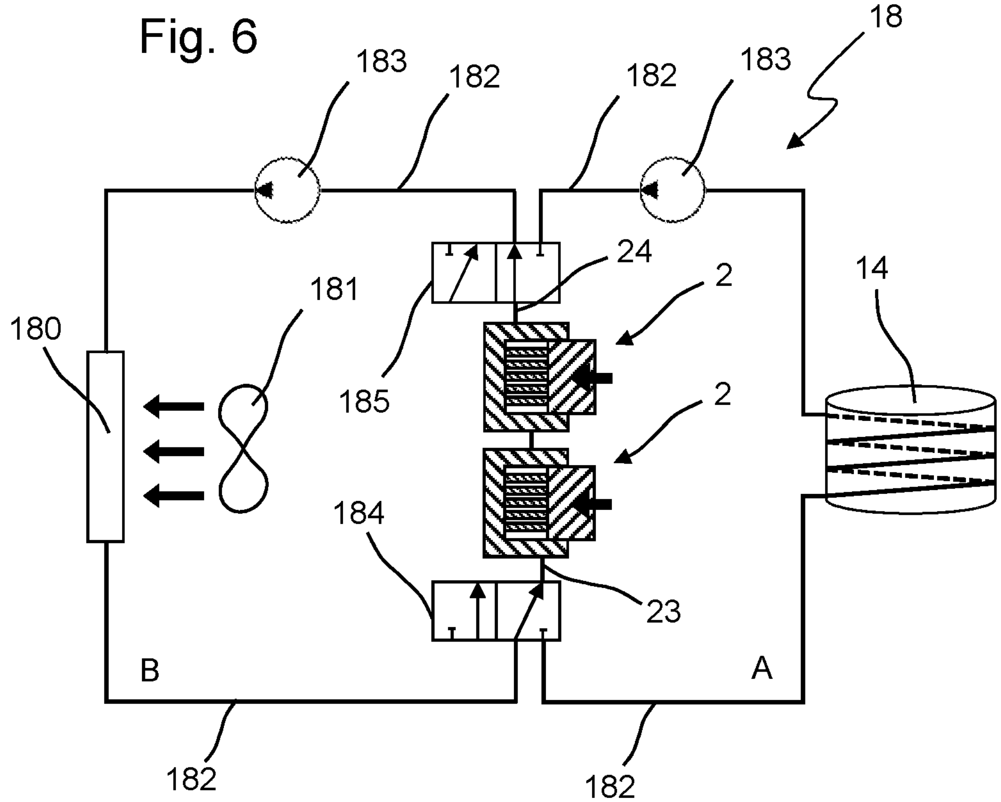
FIG. 6 shows a second embodiment of a cooling device with a plurality of cooling units.

FIG. 6 shows a further embodiment of a cooling device 18. In contrast to the cooling device 18 of FIG. 5, the one in FIG. 6 uses a plurality of cooling units 2. In particular, these are connected in series between the valves 184, 185. Although two cooling units 2 are shown in this embodiment of the present invention, more than two cooling units 2 can also be used. By using a plurality of cooling units 2, more elastocaloric material 22 is also used, as a result of which greater temperature swings can be achieved. At the same time, a punch 21 does not have to apply a force F at once to the sum of the elastocaloric material 22, which force would be sufficient to compress this entire elastocaloric material 22, for example. It is sufficient to apply a smaller force F to the punches 21 of the individual cooling units 2, which force is sufficient for the elastocaloric material 22 used in the individual cooling unit 2.

Figure 7:
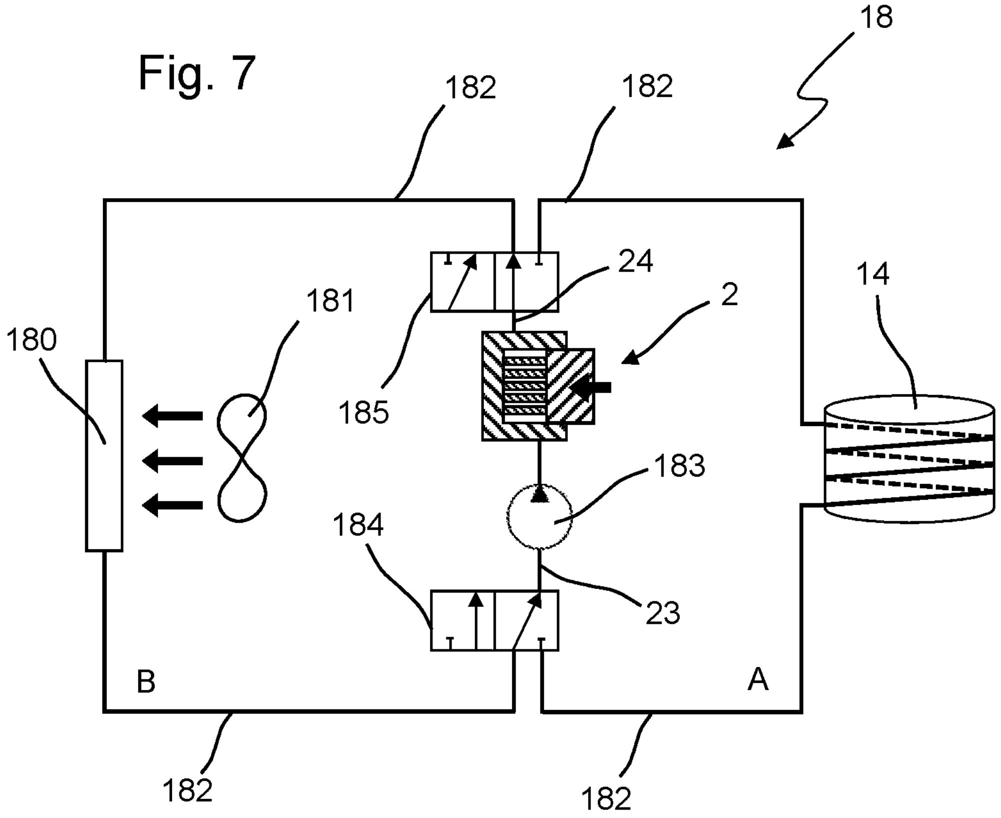
FIG. 7 shows a third embodiment of a cooling device with only one pump.

Another embodiment of a cooling device 18 is shown in FIG. 7. This differs from that of FIG. 5 in that only a single pump 183 is used to convey the coolant in the coolant lines 182 of both coolant circuits A, B. In particular, the single pump 183 of this embodiment is also located between the valves 184, 185. It is therefore connected in series with the at least one cooling unit 2 and, like this, can also be connected to one of the coolant circuits A, B via the valves 184, 185.

Figure 8:
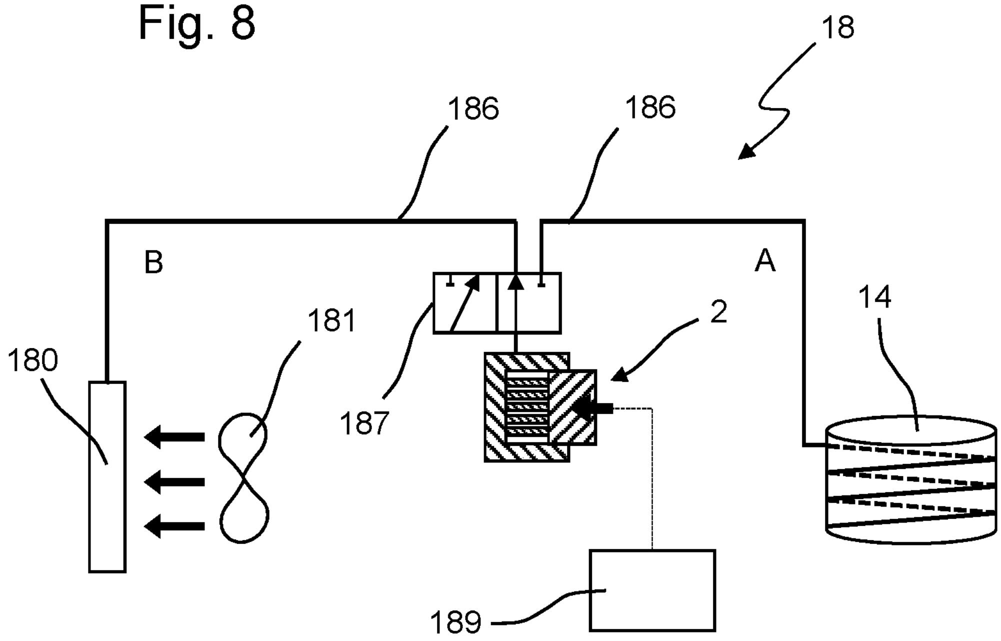
FIG. 8 shows a fourth embodiment of a cooling device with heat pipes.

Another embodiment of the cooling device 18 is shown in FIG. 8. The embodiment of FIG. 8 differs from the previous ones in that the two coolant circuits A, B are no longer implemented via coolant lines 182, but rather via one heat pipe 186 for each coolant circuit A, B. Both the outward flow and the return flow of the coolant take place within the same heat pipe 186 in the process. The heat flow from the rotor chamber 14 to the cooler 180 is implemented via a single inflow and outflow valve 187, which is synchronized with the application of force or the relaxation of the elastocaloric material 22, analogously to the previous embodiments. The inflow and outflow valve 187 can, however, also be omitted or, in a purely functional manner, shows that the heat transfer via the cooling unit 2 is also synchronized in this embodiment over the operating phases of the cooling unit 2.

Figure 8A:
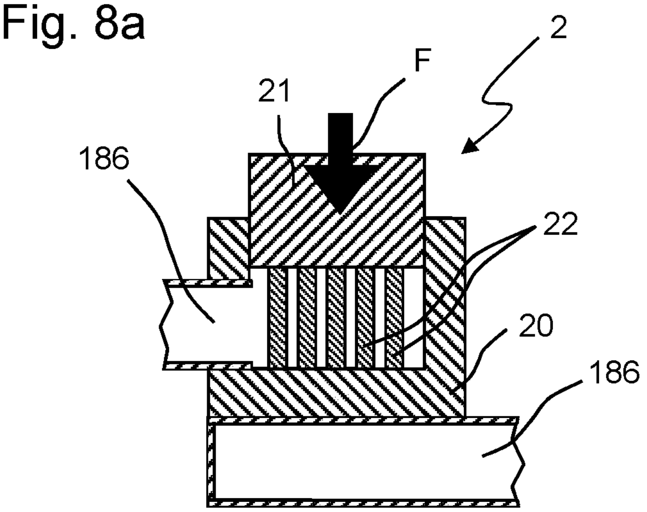
FIG. 8*a* shows a first embodiment of the connection of the heat pipes according to FIG. 8 with the cooling unit.
Figure 8B:
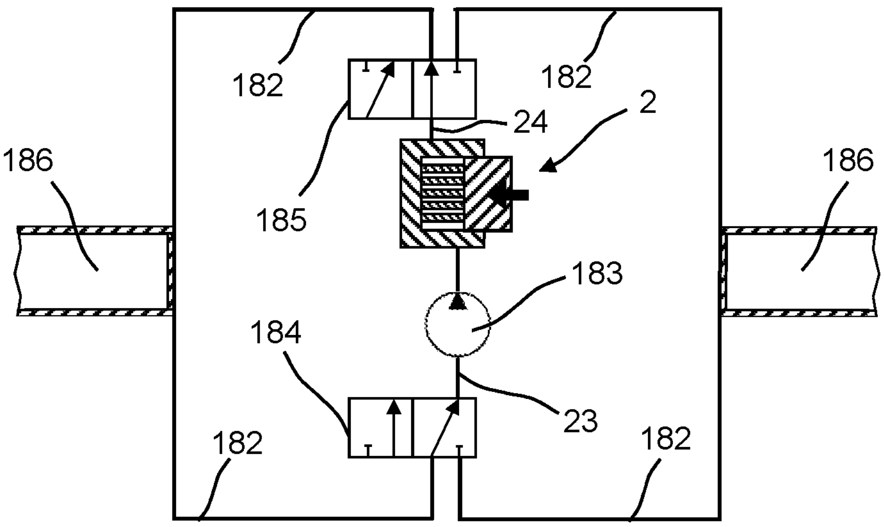
FIG. 8*b* shows a second embodiment of the connection of the heat pipes according to FIG. 8 with the cooling unit.
Figure 8C:
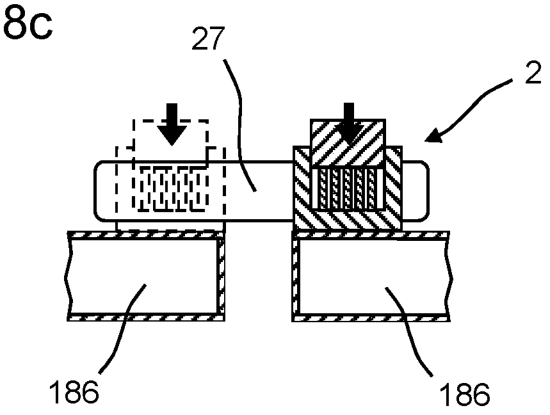
FIG. 8*c* shows a third embodiment of the connection of the heat pipes according to FIG. 8 with the cooling unit.

FIGS. 8*a*, 8*b*, and 8*c* represent different possibilities of thermally connecting the heat pipes 186 to the cooling unit 2 and the cooling units 2, respectively. FIG. 8*a*, for example, shows an embodiment in which the cooling unit 2 is installed directly with the heat pipes 186. Specifically, the cooling unit 2 is connected to the heat pipe 186 coming from the cooler 180 in such a way that the coolant of this heat pipe 186 is in direct contact with the elastocaloric material 22 inside the cooling unit 2. If the elastocaloric material 22 heats up, the coolant evaporates and is distributed in the entire interior of the heat pipe 186, as a result of which heat is quickly transported away from the cooling unit 2. During the relaxation of the elastocaloric material 22, the counter block 20, which is in thermal contact with the heat pipe 186 coming from the rotor chamber 14, is cooled. For example, the counter block 20 is arranged directly on the heat pipe 186, as shown in FIG. 8*a*. Alternatively, it would also be possible, for example, to integrate the cooling unit 2 into this heat pipe 186 in such a way that the counter block 20 is in direct contact with the coolant of the heat pipe 186. Overall, heat is therefore transferred from one heat pipe 186 to the other via the cooling unit 2.

The embodiment according to FIG. 8*b* shows the thermal connection of the two heat pipes 186 via the cooling unit 2 by means of separate circuits. In this case, therefore, additional coolant lines 182 with coolant are arranged, which are intended to transfer the heat from one heat pipe 186 to the other. The corresponding embodiment therefore substantially corresponds to the arrangements of the coolant circuits as shown in FIGS. 5, 6, and 7 and described in the corresponding passages of the description, whereby heat transfer only does not take place directly between the rotor chamber 14 and the cooler 180, but it rather takes place between the two heat pipes 186. Reference is therefore made to the corresponding embodiments in order to avoid repetition.

Another embodiment of the present invention is shown in FIG. 8*c*. This comprises a transport device 27 which is designed to adjust the cooling unit 2 between two positions, the cooling unit 2 being in contact with one of the two heat pipes 186 in each of the positions. The transport device 27 can include in this case, for example, a linear actuator, for example with a rail or the like. The adjustment of the cooling unit 2 between the two positions is synchronized with the operating phases of the cooling unit 2, so that the cooling unit 2 is in contact with the heat pipe 186 coming from the rotor chamber 14, while the elastocaloric material 22 relaxes and cools down in the process, and so that the cooling unit 2 is in contact with the heat pipe 186 coming from the cooler 180, while the force F is applied to the elastocaloric material 22 which is heated in the process. In this way, too, heat is transferred from one heat pipe 186 to the other via the cooling unit 2.

In addition, FIG. 8 shows, by way of example, a drive motor 189 which is designed to apply the force F to the punch 21 of the cooling unit 2 and thus to the elastocaloric material 22. The drive motor 189 (not shown for reasons of clarity) can also be provided in the embodiments shown above. In particular, the drive motor 189 drives all of the cooling units 2 of the cooling device 18. In principle, the drive motor 189 can be the drive motor 17 which drives the rotor 16 of the laboratory centrifuge 1. In the embodiment shown, however, it is a separate drive motor 189 which is designed exclusively to drive the cooling unit 2.

Figure 9:
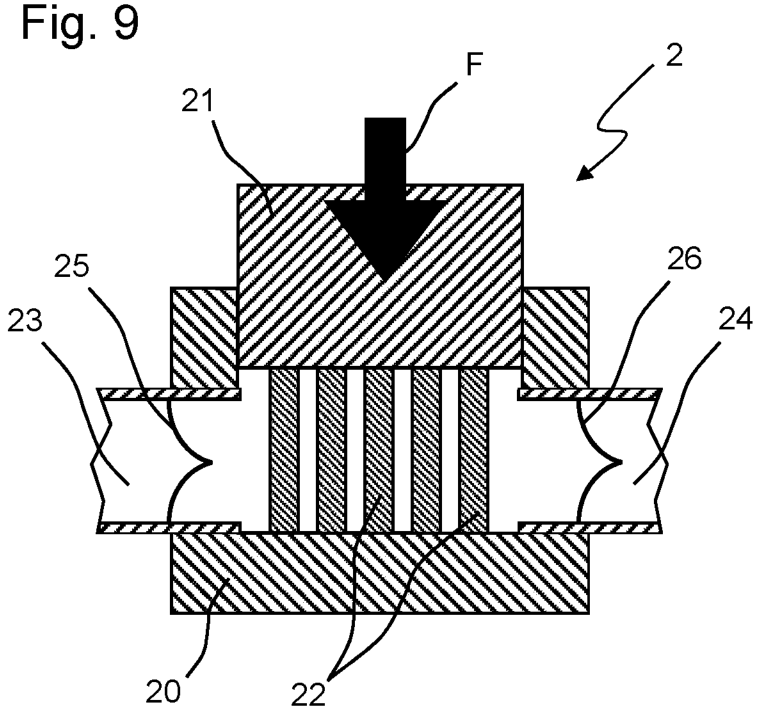
FIG. 9 is a cross section through a further embodiment of a cooling unit.

FIG. 9 shows a cooling unit 2 which is advantageously designed to utilize the latent heat of the coolant. For this purpose, the cooling unit 2, in contrast to the cooling unit 2 in FIG. 4, has an inlet valve 25 in its feed line 23 and an outlet valve 26 in its discharge line 24. The valves 25, 26 are, for example, overpressure valves which, however, can only open in one direction, specifically in the same direction, to the right in the embodiment shown in FIG. 9. The mode of operation of the cooling unit 2 according to FIG. 9 is as follows: By applying the force F to the elastocaloric material 22, heat is released. This is absorbed by the coolant, which is located in the direct vicinity of the elastocaloric material 22, whereby the coolant evaporates. This increases the pressure in the interior of the cooling unit 2, which in turn opens the outlet valve 26 and at least part of the evaporated coolant escapes to the right from the cooling unit 2, taking the absorbed heat with it in the process. This is followed by the phase of relaxation of the elastocaloric material 22, as a result of which it cools. As a result of the cooling, the pressure in the interior of the cooling unit 2 drops. The pressure drops until the inlet valve 25 opens and coolant flows into the cooling unit 2 from the left. Since the drop in pressure takes a specific amount of time, the elastocaloric material 22 also cools the counter block 20, which consists of a material with good thermal conductivity, for example metal. This process is repeated periodically so that the bottom line is that the heat released by the elastocaloric material 22 is transported away from the cooling unit 2 with the coolant in the direction of flow, i.e., to the right, while the counter block 20 continues to cool and further coolant flows into the cooling unit 2 from the left. The application of a force F to the elastocaloric material 22 via the punch 21 therefore leads, on the one hand, to a mass transport of the coolant through the cooling unit 2 and, on the other hand, to the heating of the coolant and a cooling of the counter block 20.

Figure 10:
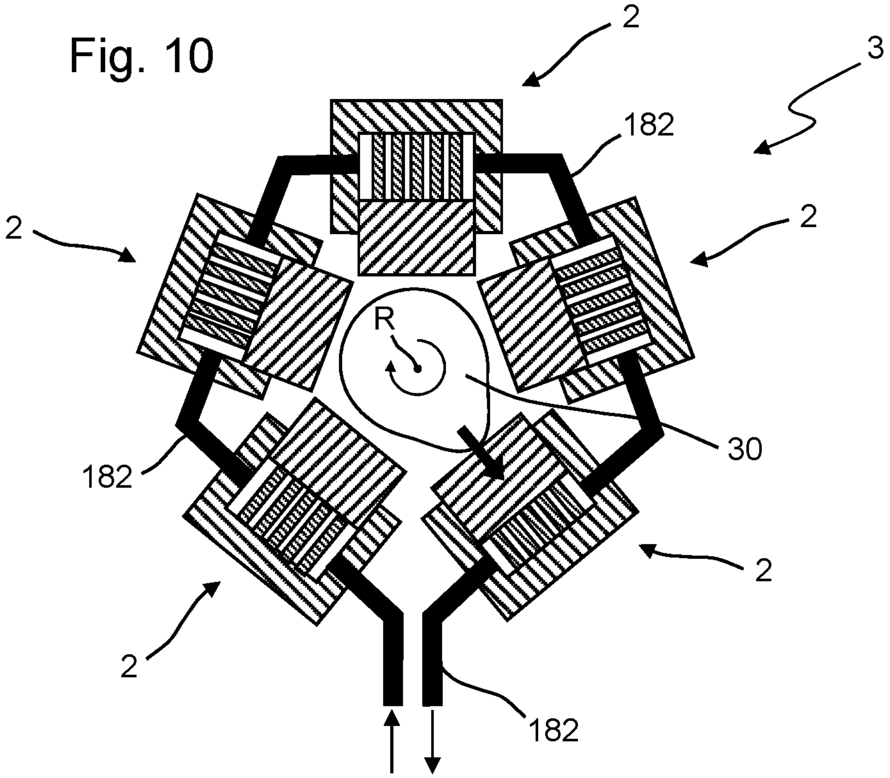
FIG. 10 is a cross section through a cooling group with cooling units according to FIG. 9.

FIG. 10 shows a cooling group 3 in which these effects are used. Specifically, the cooling group 3 comprises a plurality of, in this case five, cooling units 2 according to FIG. 9. The cooling units 2 are connected to one another and connected in series via a coolant line 182. In addition, the cooling group 3 comprises an eccentric 30 which is designed to rotate about an axis of rotation R. As a result of the rotation of the eccentric 30, a force F is applied successively to the punches 21 of the cooling units 2 arranged in a circle around the eccentric 30. In this way, as described above for FIG. 9, the coolant located in the cooling units 2 is conveyed in the direction of rotation of the eccentric 30 through the coolant line 182 and the cooling units 2. In this case, the coolant is heated more and more while the counter blocks 20 of the cooling units 2 cool down. Overall, the cooling group 3 therefore implements both a conveyance of the coolant and a separation of the heat and cold made available by the elastocaloric material 22.

Figure 11:
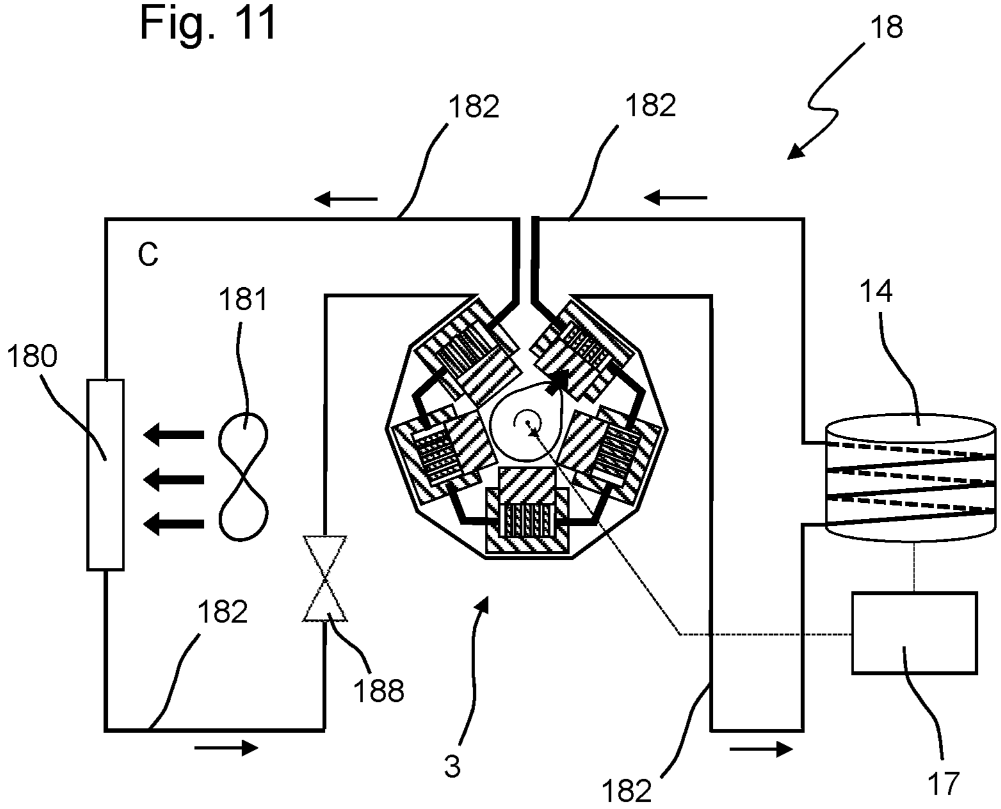
FIG. 11 shows a fifth embodiment of a cooling device with a cooling group according to FIG. 10.

FIG. 11 shows an embodiment of a cooling device 18 using a cooling group 3 according to FIG. 10. The cooling device 18 takes advantage of the fact that the cooling group 3 provides a delivery rate for the coolant, which, however, is solely due to the heat transfer and is therefore exclusively passive. An active delivery of the coolant is not necessary, which is why this embodiment works completely without a pump. It comprises a single coolant circuit C, which is formed, for example, by coolant lines 182, but could just as well be formed by heat pipes 186. Specifically, the coolant absorbs heat in the rotor chamber 14 of the laboratory centrifuge 1, which operates at approximately 4° C. This heat is transported with the coolant via the coolant line 182 to the cooling group 3. As described above, the coolant is passed through the cooling group 3 and is heated up in the process while the counter blocks 20 of the cooling units 2 of the cooling group 3 cool down. The heated coolant is then transported via the coolant lines 182 to the cooler 180, which typically operates at room temperature, for example 21° C., and where the coolant is cooled with the aid of the fan 181. In the direction of flow behind the cooler 180, the coolant passes a valve 188, which separates the hot from the cold side and regulates the flow. The coolant cooled by the cooler 180 is then brought into contact with the counter blocks 20 of the cooling units 2 of the cooling group 3 directly. In particular, the sequence of the contact of the coolant on the backflow side to the rotor chamber 14 with the counter blocks 20 of the cooling units 2 corresponds to the opposite flow direction of the cooling units 2 through the coolant. The counter block 20 of the cooling unit 2 through which the coolant flows last within the cooling group 3 is therefore contacted first with the coolant, while the counter block 20 of the cooling unit 2 through which the coolant flows first within the cooling group 3 is contacted last with the coolant. The coolant transfers heat to the counter blocks 20 or is cooled by them until it is finally cold enough to absorb heat from the interior 141 of the rotor chamber 14 again. For the operation of this cooling device 18, it is only necessary to drive the eccentric 30 of the cooling group 3 and the fan 181. As is also shown in FIG. 11, the drive of the rotor 16 of the laboratory centrifuge 1 takes place within the rotor chamber 14 and the drive of the eccentric 30 of the cooling group 3 takes place by means of the same drive motor 17. This drive motor 17 can also be used to drive the fan 181.

Figure 12:
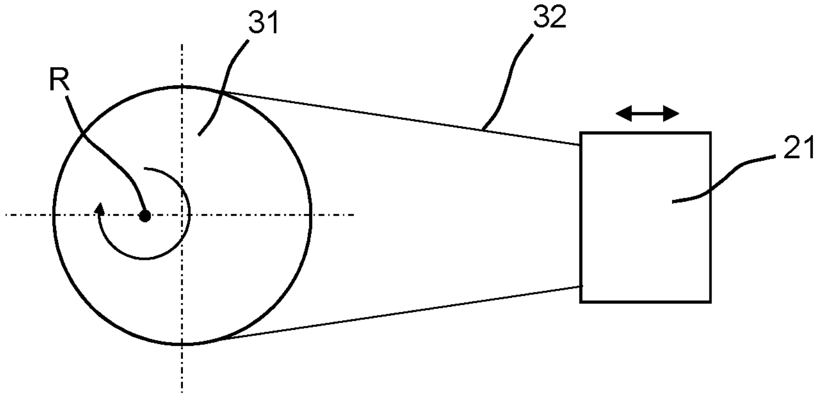
FIG. 12 shows a drive for the cooling unit with an eccentric shaft and a piston.
Figure 13:
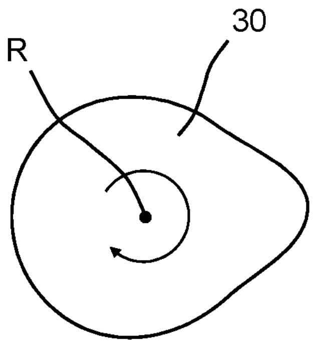
FIG. 13 shows a drive for the cooling unit with an eccentric.
Figure 14:
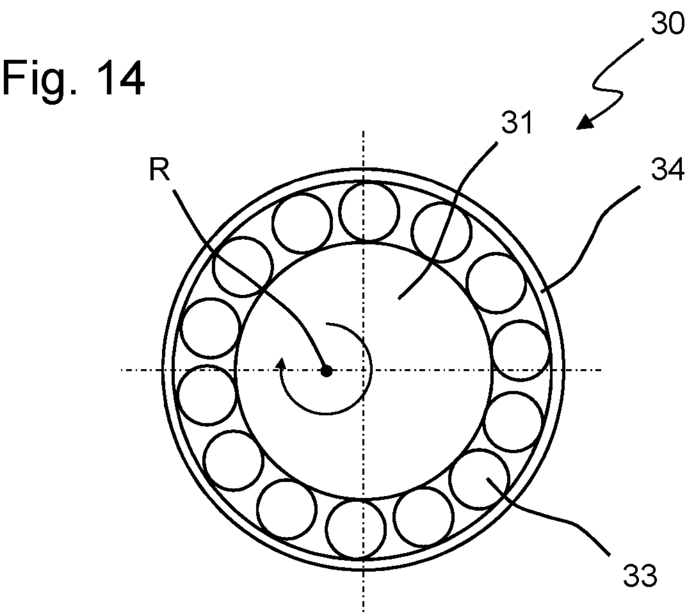
FIG. 14 shows a drive for the cooling unit with an eccentric shaft and a sleeve.

FIGS. 12, 13, and 14 show various possibilities for driving the cooling unit 2, i.e., for applying a force F to the punch 21 and the elastocaloric material 22. FIG. 12 shows, for example, a shaft 31 driven eccentrically about the axis of rotation R, which is connected to a piston 32 to convert the rotational movement into a linear movement, for example in the manner of a crankshaft. The piston 32 in turn transmits the movement to the punch 21 of the cooling unit 2. FIG. 13 shows an eccentric 30 rotating about the axis of rotation R, for example a cam of a camshaft. During the rotation of the eccentric 30, its eccentric bulge strikes the punch 21 of the cooling unit 2 and thus applies the force F thereto. In this case, however, there are strong frictional forces between the eccentric 30 and the punch 21. In order to avoid disadvantages associated therewith, the eccentric 30 according to FIG. 14 is therefore proposed. This in turn has an eccentric shaft 31 which can be rotated about the axis of rotation R. A ball bearing 33 is arranged on the outer circumferential surface of the eccentric shaft 31, via which, in turn, a sleeve 34 is mounted on the eccentric shaft 31. In particular, the sleeve 34 completely encloses both the ball bearing 33 and the eccentric shaft 31. The eccentric 30 according to FIG. 14 therefore comes into contact with the sleeve 34 with the punches 21 of the cooling units 2. Since the sleeve 34 is rotatably mounted relative to the eccentric shaft 31 via the ball bearing 33, the sleeve 34 rolls on the eccentric shaft 31, thereby avoiding damage to the sleeve 34 or the eccentric 30 as a whole and to the punch 21. At the same time, less drive energy has to be used. The eccentric 30 according to FIG. 14 is therefore particularly suitable for use in the cooling group 3. The eccentric shafts 31 and the eccentric 30 can be driven by the drive motor 17, 189 used in each case.

Figure 15:
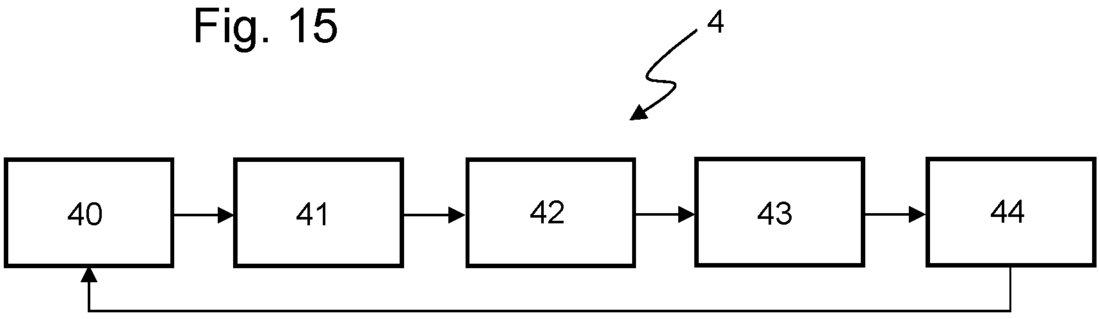
FIG. 15 is a flowchart of the method.

FIG. 15 shows a flowchart of method 4. The method 4 begins with the transfer 40 of heat from the interior 141 of the rotor chamber 14 to a coolant. The coolant is then transported to the elastocaloric material 22 of the cooling unit 2. There follows the transfer 41 of heat from the elastocaloric material 22 to the coolant, which is thereby heated above the ambient temperature. In the next step, the coolant is cooled 42 in a cooler 180 which operates at ambient temperature. The coolant cooled in this way is then conducted back to the cooling unit 2, where heat is transferred 43 from the coolant to the elastocaloric material 22, as a result of which the coolant is cooled down to at least the operating temperature of the rotor chamber 14. Finally, the supply 44 of the coolant to the rotor chamber 14 of the laboratory centrifuge 1 then follows. There, the coolant can again absorb heat from the interior 141 of the rotor chamber 14, and the method 4 begins again. All in all, the use according to the present invention of the elastocaloric effect for cooling a centrifuge, in particular a laboratory centrifuge 1, prevents the use of environmentally harmful and flammable coolants typically used in compressor cooling. By using the embodiments described, it is also possible to achieve a high level of economy in terms of both manufacturing and operating costs.

What is claimed is:

1. A centrifuge, comprising:

a rotor rotatably mounted in an interior of a rotor chamber and being designed to accommodate sample vessels, a drive motor to set the rotor in rotation, and a cooling device designed to dissipate heat from the interior of the rotor chamber via a coolant, wherein the cooling device is designed to use an elastocaloric effect and has at least one cooling unit which comprises an elastocaloric material arranged between a counter block and a punch, the punch being designed to periodically apply a force to the elastocaloric material and then to let the elastocaloric material relax again, the cooling device being designed to transfer both heat from the elastocaloric material to the coolant and from the coolant to the elastocaloric material, wherein the cooling device comprises a cooling group which has a plurality of cooling units connected in series, the cooling units being arranged and designed such that a rotating eccentric successively applies a force to the punches of the cooling units, wherein the eccentric has an eccentrically rotating shaft which is surrounded by a sleeve that is rotatable relative to the shaft, and wherein the drive motor drives both the rotor and the eccentric.

2. The centrifuge according to claim 1, wherein the cooling device has two coolant circuits, and wherein the cooling unit is connectable to one of the two coolant circuits via valves.

3. The centrifuge according to claim 2, wherein at least one pump is provided which conveys the coolant in both coolant circuits.

4. The centrifuge according to claim 2, wherein each of the two coolant circuits comprises a heat pipe and the coolant is transported in the coolant circuits exclusively passively.

5. The centrifuge according to claim 1, wherein the cooling device comprises at least one of the following features:

the cooling device has a plurality of cooling units connected in series, the counter block and the punch are designed to periodically apply pressure to the elastocaloric material, the elastocaloric material is designed to be rod-shaped, the cooling device comprises a plurality of elements with elastocaloric material, the cooling device is designed to use latent heat of the coolant, the cooling device is designed to transport heat from the rotor chamber of the centrifuge to a cooler equipped with a fan, which is designed to dissipate at least part of the heat into ambient air, the coolant is in direct contact with at least one of the counter block and the elastocaloric material, the coolant comprises at least one of water and ethanol, the cooling device comprises a drive motor which is designed to periodically apply the force to the punch, the drive motor is a motor from a group consisting of electromagnetic linear drive, spindle-mechanical linear drive, hydraulic unit, piezo actuator, pneumatic unit, lifting magnets, and the elastocaloric material comprises at least one material from a group consisting of nickel-titanium alloy (NiTi), nickel-titanium-copper alloy (NiTiCu), nickel-iron-gallium alloy ($Ni_2FeGa$), copper-zinc-aluminum alloy (CuZnAl), nickel-titanium-hafnium alloy (NiTiHf), copper-aluminum-nickel alloy (CuAlNi), copper-aluminum-beryllium alloy (CuAlBe), titanium-nickel-iron alloy (TiNiFe), titanium-nickel-copper-cobalt alloy (TiNiCuCo).

6. The centrifuge according to claim 1, wherein the cooling device has only one coolant circuit and transport of the coolant in this coolant circuit takes place exclusively passively.

7. A method for cooling the interior of the rotor chamber of the centrifuge according to claim 1, comprising the steps of:

transferring heat from the interior of the rotor chamber to the coolant, transferring heat from the elastocaloric material to the coolant, cooling the coolant in the cooling device, transferring heat from the coolant to the elastocaloric material, and feeding the coolant to the rotor chamber of the centrifuge.

8. The centrifuge according to claim 1, wherein the centrifuge comprises a laboratory centrifuge.

9. The centrifuge according to claim 3, wherein a single pump is provided for both coolant circuits.

10. The centrifuge according to claim 1, wherein the sleeve is mounted via a ball bearing on the shaft.

* * * * *